US008480226B2

(12) United States Patent
Ifergan

(10) Patent No.: US 8,480,226 B2
(45) Date of Patent: Jul. 9, 2013

(54) FRAME CONSTRUCTION FOR EYEWEAR

(76) Inventor: Nonu Ifergan, Mt. Royal (CA)

( * ) Notice: Subject to any disclaimer, the term of this patent is extended or adjusted under 35 U.S.C. 154(b) by 275 days.

(21) Appl. No.: 12/804,511

(22) Filed: Jul. 22, 2010

(65) Prior Publication Data

US 2011/0075094 A1 Mar. 31, 2011

Related U.S. Application Data

(60) Provisional application No. 61/271,531, filed on Jul. 22, 2009.

(51) Int. Cl.
*G02C 9/00* (2006.01)

(52) U.S. Cl.
USPC .............................................. 351/47; 351/57

(58) Field of Classification Search
USPC .................... 351/47, 48, 57, 58, 41
See application file for complete search history.

(56) References Cited

U.S. PATENT DOCUMENTS

| 6,012,811 | A | | 1/2000 | Chao | |
|---|---|---|---|---|---|
| 6,109,747 | A | | 8/2000 | Chao | |
| 6,116,730 | A | * | 9/2000 | Kwok | 351/47 |
| 6,120,144 | A | * | 9/2000 | Park | 351/47 |
| 6,170,949 | B1 | * | 1/2001 | Mauch | 351/47 |
| 6,343,858 | B1 | * | 2/2002 | Zelman | 351/47 |
| 6,364,478 | B1 | * | 4/2002 | Jagasia | 351/47 |
| 6,729,723 | B2 | * | 5/2004 | Xie | 351/57 |
| 6,811,254 | B2 | | 11/2004 | Ifergan | |
| 6,834,951 | B2 | * | 12/2004 | Xie | 351/57 |
| 6,939,003 | B2 | | 9/2005 | Kidouchim | |
| 7,370,961 | B2 | | 5/2008 | Lerner | |

* cited by examiner

*Primary Examiner* — Hung Dang
(74) *Attorney, Agent, or Firm* — Thomas A. O'Rourke; Bodner & O'Rourke, LLP

(57) ABSTRACT

An eyeglass assembly is provided and includes a frame assembly and at least one subframe assembly. The frame assembly has at least one lens and a pair of temples. The frame assembly also has a bridge. A rear side of the frame assembly has at least one member extending outwardly therefrom and wherein the extending member has at least one securing surface. The securing surface has a magnetic member thereon. The subframe assembly has a front side and a rear side. The subframe assembly has at least one arm extending rearwardly therefrom. The arm has a first end secured to the subframe assembly and a second end opposite said first end. The second end has a magnetic member thereon. The subframe assembly is magnetically secured to the frame assembly at least in part by the magnetic members, one of the magnetic members being a magnet and a second of the magnetic members being a material that is attracted to a magnet.

35 Claims, 12 Drawing Sheets

FRAME CONSTRUCTION FOR EYEWEAR

This application claims priority on U.S. Provisional Patent Application Ser. No. 61/271,531 filed Jul. 22, 2009, the disclosures of which are incorporated herein by reference.

FIELD OF THE INVENTION

The present invention relates generally to eyewear frames and lenses. More particularly, the present invention relates to eyewear assemblies for positioning a single lens or a set of lenses in front of at least one lens area of an eyewear frame. One or both portions of the eyewear frame may contain a lens or lenses.

BACKGROUND OF THE INVENTION

Many people require eyewear to improve or facilitate vision. While there are surgical procedures available to correct some vision problems, and contact lenses as well, these approaches are not always satisfactory for every condition. As a result, there is a variety of different types of eyewear available. The eyewear may be used for a number of reasons including but not limited to correcting vision issues. Eyewear may also be required to protect the eye from damage or injury. In some instances, the eyewear may be desired for fashion or aesthetic reasons.

The eyewear may include one or more lenses secured to each other or to a frame. In addition to the eyewear, which may be denominated a primary lens assembly, there may also be a secondary lens assembly used in conjunction with the primary lens assembly. The secondary lens assembly may be desired for a variety of reasons. One reason for using a secondary lens assembly may be to reduce sun glare. Another reason may be to protect the eyes from damage or injury. Another reason may be to avoid the expense of progressive lenses. Progressive lenses resolve a number of vision issues in a single lens. Thus, there can be one portion of the lens that permits reading or a other section of the lens for distance viewing. There may also be lenses that provide both types of correction to a user's eyes in a single lens. While the progressive lenses solve many problems for wearers, they are still not satisfactory for everyone. Some people have issues with the costs of the lenses. Others are concerned with their ability to see clearly under a variety of conditions. Where the progressive lens is small in size because the user wants the glasses to have as minimal a visual impact on their looks as possible, the users' ability to see out of the progressive lens can be compromised. Because there is a smaller viewing area for the eye to see through for each area of the lens in a small progressive lens, there have been complaints from users that it is not easy to use certain regions of the lenses. Thus, a user may opt to avoid the progressive lenses and use a secondary lens over the primary lens when necessary.

Other users like the convenience of a secondary set of lenses over a primary set of lenses. This permits a user to have the comfort and ease of use of the primary lenses coupled with a secondary set of lenses for situations where the attributes of the second set of lenses are desirable such as for sun glare, etc.

The secondary lens assembly may be positioned in front of the primary lens assembly or it may be behind the primary lens assembly as shown in U.S. Pat. No. 7,370,961, the disclosures of which are incorporated herein by reference.

While in some instances the secondary lens assembly may be merely clipped on the front of the primary lens assembly, there are also a number of other approaches for securing the secondary lens assembly to the primary lens assembly. These can be seen in U.S. Pat. No. 6,811,254 to Ifergan, U.S. Pat. No. 6,116,730 to Kwok, U.S. Pat. No. 6,109,747 to Chao, U.S. Pat. No. 6,012,811 to Chao and U.S. Pat. No. 6,939,003 to Kidouchin, the disclosures of which are incorporated herein by reference.

OBJECTS OF THE INVENTION

An object of the invention is to remedy the problems of the prior art noted above and in particular to provide an eyeglasses assembly that is more attractive than corresponding structures in prior eyeglasses and less expensive than many of them.

Another object of the invention is to provide eyeglasses and clip-ons that take advantage of the new styling possibilities afforded by the invention.

Another object of the invention is to provide eyeglasses of improved quality and stability.

SUMMARY OF THE INVENTION

In one embodiment of the present invention an eyeglass device may include a primary spectacle frame and an auxiliary spectacle frame (each of which frames may support respective lenses). The primary spectacle frame may include two temples pivotally coupled to two side extensions. Further, the auxiliary spectacle frame may include two arms extending from the auxiliary spectacle frame for engagement with a bracket extending from the rear of the primary spectacle frame. In addition, each of the primary spectacle frame and the auxiliary spectacle frame may include one or more magnetically interacting materials (e.g., one or more magnets and/or one or more ferrous metals). The one or more magnetically interacting materials of the primary spectacle frame may be disposed on the brackets in the vicinity of one or both of the side extensions. Likewise, the one or more magnetically interacting materials of the auxiliary spectacle frame may be disposed on the arms extending from the auxiliary spectacle frame. The magnetically interacting materials of the primary spectacle frame and the auxiliary spectacle frame may cooperate to secure the spectacle frames together (e.g., so as to prevent the auxiliary spectacle frame from moving downward and/or upward relative to the primary spectacle frame).

DETAILED DESCRIPTION OF THE INVENTION

Figure 1:
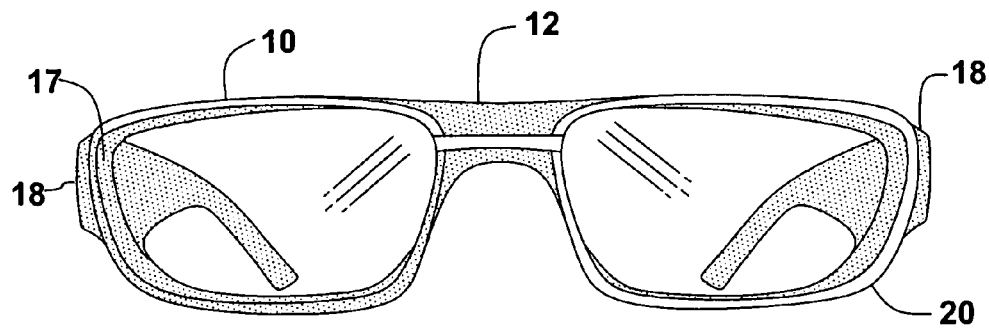
FIG. 1 is a front view of an eyewear assembly in which there is a secondary lens assembly removably secured over a primary lens assembly. The primary lens assembly may be preferably made of a plastic or nonmetallic material.
Figure 2:
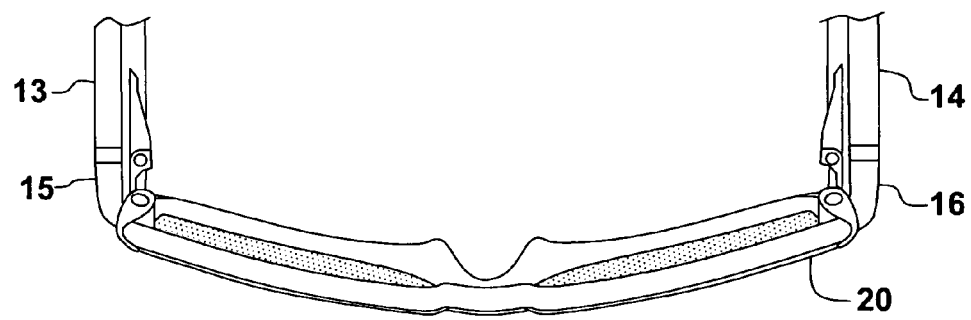
FIG. 2 is a top view of the eyewear assembly of FIG. 1.

Referring to the drawings and in particular FIGS. 1-4 there is a primary frame which may be worn by a user in accordance with one embodiment of the invention. In addition to the primary frame there is a secondary frame that may be removably secured to the frame. Although the Figures show a frame surrounding the outer surface of each of the lenses on the primary frame, it will be appreciated by those skilled in the art that the teachings of the present invention are equally applicable to frameless eyeglass assemblies as well as eyeglass assemblies where the frame contacts only a portion of the outer edges of the lenses.

The present invention includes a primary frame 10 for supporting usually at least one primary lens and more commonly two lenses 11. The primary spectacle 10 frame typically may have a pair of lenses separated by a bridge or brow bar 12 for resting the eyewear assembly on the nose of a user. An additional bridge can also be provided in addition to or as a alternative to the brow bar 12. See e.g., the secondary lens assembly in FIG. 21. The additional bridge can be for providing added strength to the frame or for decorative or non-functional purposes. The primary lens assembly 10 also has two temples, ear pieces or ear stems 13 and 14 that are connected to the respective lenses by suitable means. The ear pieces, for example, may be connected to the respective lenses at corresponding projecting end pieces 15 and 16. The temples are preferably pivotably or hingedly connected to the lenses or the frame.

The primary spectacle frame 10 may be made of any suitable material. For example the frame may be formed at least partially or completely of metal and/or one or more resin based or thermoplastic materials. The eyewear of the present invention may also be "rimless" i.e. where the temples and the bridge are directly secured to the lenses with threaded fasteners, posts and the like. In still a further embodiment, the primary lens assembly may also comprise a flexible wire that forms at least a portion of the lens-securing frame.

The end pieces 15 and 16 may extend outwardly of the primary spectacle frame 10 or may extend generally rearwardly from the outer side edges 17 and 18 of the frame. The end pieces 15 and 16 may have a body portion 19 that extends outwardly of the frame from the side edges 17 and 18 of the frame. One end of the body portion 19 is secured to the frame and the other end has temple or ear stem pivotably extending rearwardly or toward the ears of a user. The temples or ear stems 13 and 14 may be hingedly attached to the extensions 15 and 16 or they may be integral therewith. Alternatively, the temples may be secured directly to the lenses or elsewhere on the frame. There are many well-known methods of attaching temples to the frame, lens or the side extensions 15 and 16. Each of the temples or ear pieces 13 and 14 are preferably pivotally mounted to the frame, the lenses or the side extensions 15 and 16. The temples can be configured in any suitable manner. The lens holding structures of the frame 10 are sized and configured to receive a pair of lenses.

Various means can be provided by which one or two lenses, as part of a secondary lens assembly, can be removably connected to a primary frame assembly 10 that may or may not already have a lens or lenses contained therein. In the preferred embodiment of the present invention, the primary lens assembly has a pair of lenses and the secondary lens assembly also has a pair of lenses. It will be appreciated, however, that either assembly can have one lens or no lenses in certain circumstances.

The secondary lens assembly 20 may be removably secured to the primary lens assembly by a variety of means. In one embodiment of the present invention, the primary frame assembly 10 and the secondary frame assembly 20 may be secured together by a suitable means. One suitable means of securing the primary frame assembly to the secondary frame assembly is through the use of a magnet or a material attracted to a magnet on one of either the primary frame assembly 10 or the secondary frame assembly 20 with the other of the primary frame assembly or the secondary frame assembly having a magnetic material or a material attracted to a magnetic material so that the two assemblies are magnetically secured together. Other securing means can also be used.

To facilitate securing the secondary frame assembly to the primary frame assembly there is preferably a protrusion or ledge 22 on a surface of one of the frame assemblies that receives a magnet or a material that is attracted to a magnet. The protrusion or ledge 22 may be any suitable shape. In one embodiment, the protruding member or ledge can preferably be in the form of a bracket or a corbel. A corbel may be defined as a member that is secured to the surface of the frame or integral therewith and extends outwardly therefrom for providing support. Preferably, the primary lens assembly may have at least one bracket or corbel 22 that facilitates securing the secondary lens assembly to the primary lens assembly.

Figure 3:
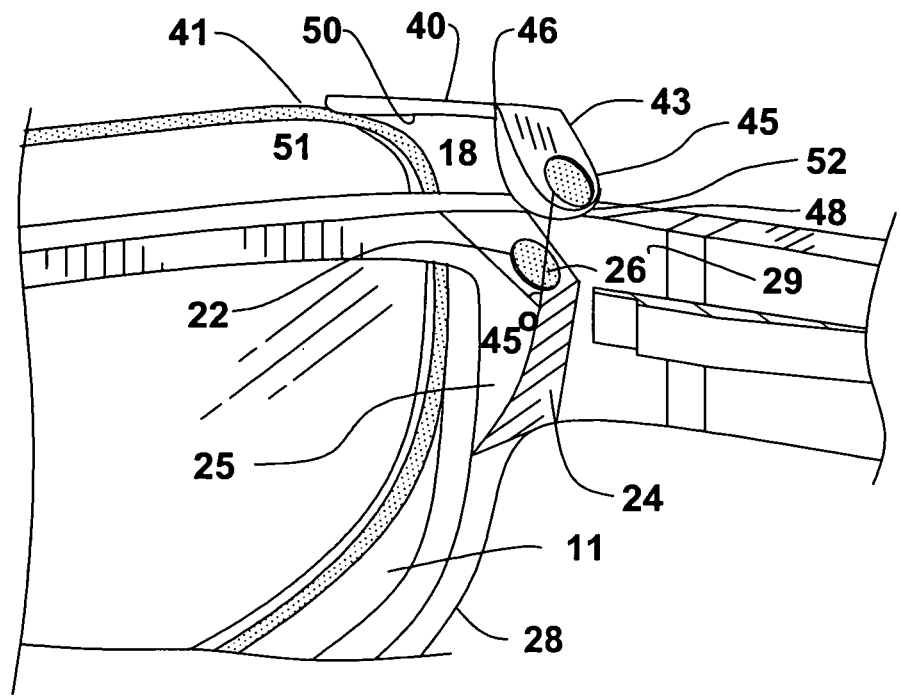
FIG. 3 is an exploded view of the secondary lens assembly in position above the right side of the primary lens assembly as viewed by a wearer.
Figure 4:
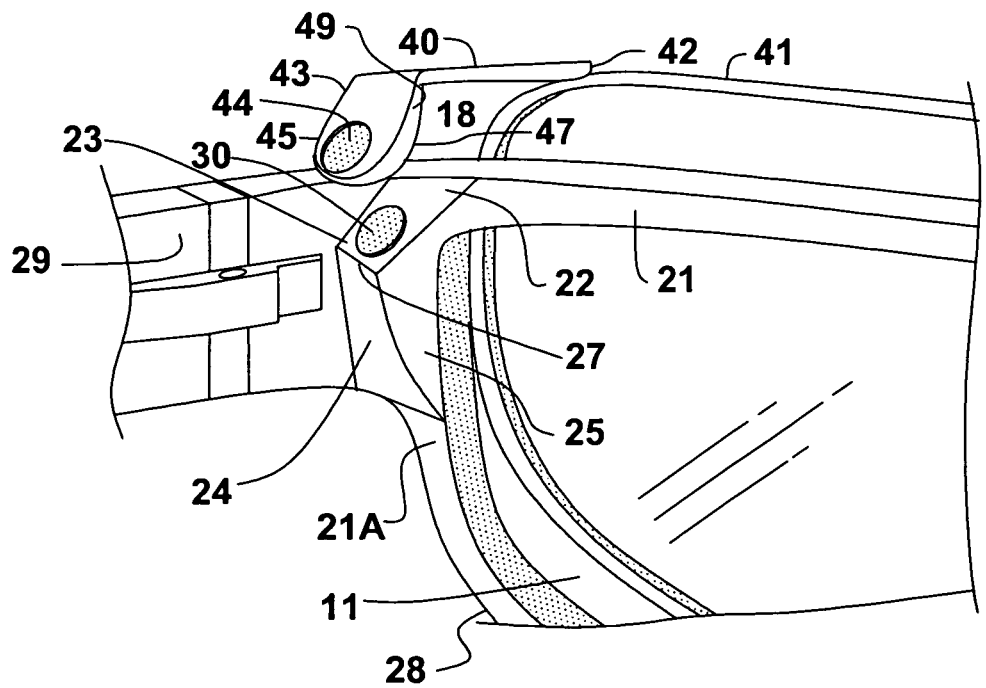
FIG. 4 is an exploded view of the secondary lens assembly in position above the left side of the primary lens assembly as viewed by a wearer.
Figure 5:
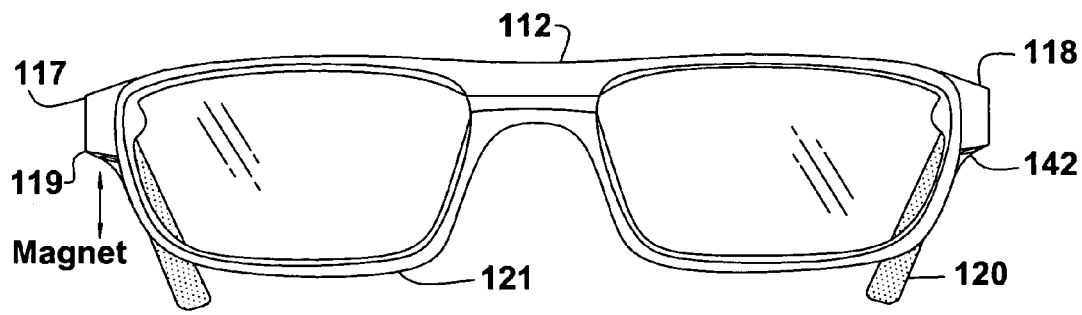
FIG. 5 is a front view of an alternative embodiment of an eyewear assembly in which there is a secondary lens assembly secured generally under a primary lens assembly. The primary lens assembly may be preferably made of a plastic or nonmetallic material.
Figure 6:
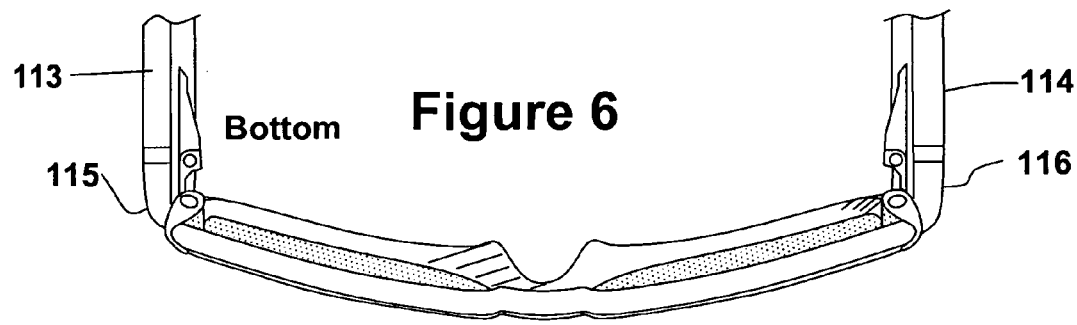
FIG. 6 is a bottom view of the eyewear assembly of FIG. 5.

As seen in FIGS. 3 and 4, on the inner or inside surface of the primary frame 21 there is at least one corbel 22 extending from the frame and secured thereto. The corbel 22 may be formed integral with the frame or it may be a separate member that is secured to the frame by any suitable means. Preferably, the inside surface of the frame has at least two corbels, each at opposite ends of the frame. The corbel 22 may have a top surface 23, a front sidewall 24 and at least one side surface 25. The top surface 23 is generally a flat region that may be generally horizontal or it may be angled as desired. In a preferred embodiment, the top surface is angled such that it is about 45° of vertical axis 26. The vertical axis may be defined as an imaginary line extending generally perpendicular to a plane form by the top surface of the frame. The vertical axis could also be generally perpendicular to an axis formed generally by the top surface of the temples. If the frames have a unique shape, the vertical axis can be defined as being generally perpendicular to the ground. Alternatively, the axis may be generally parallel to an imaginary line formed by a surface of one of the lenses which when worn by a user would be generally perpendicular to the ground. The angle shown in FIG. 3 can range from about 5° of vertical axis to up to generally horizontal.

The top surface of the corbel extends outwardly of the rear or inner surface 21 of the frame between one of the lenses in the frame and the outer end or edge of the frame. The top surface 23 of the corbel ends in an edge 27 where the front sidewall 24 connects to the top surface. The front sidewall 24 extends downwardly toward the bottom surface or edge 28 of the frame and may be generally vertical in, for example, roughly the same plane as or a plane parallel to the axis 26 or it may angle inwardly to wall the inside surface 21A of the frame. The corbel may have a pair of side surfaces or there may only be a single exposed side surface 25 with the opposite side of the corbel integral with the inner surface 29 of the extensions 15 and 16 portions of the frame.

The top surface 23 of the corbel 22 may be provided with a securing means 30 for securing a secondary frame to the primary frame. The securing means may be any suitable means of connecting a secondary frame or a portion thereof to the top surface of the corbel. In a preferred embodiment, the top surface 23 of the corbel 22 may be provided with a magnetic member 30 which may be a magnet or a material attracted to a magnet. In one embodiment, the magnetic member may be a disk secured to the surface of the corbel. In another embodiment, the magnetic member may be a short pin or rod that is inserted into a recess or orifice in the top surface of the corbel. The pin or rod may be any suitable shape or design and may be secured to the orifice by an adhesive or other suitable means.

The secondary lens assembly 20 may be secured to the primary lens assembly by means of an arm 40 extending from a surface of the secondary frame or lens. Preferably, the arm extends from the top portion 41 of the frame, but it will be appreciated that the arm can extend from other areas on the secondary eyewear assembly as desired. One end 42 of the arm is secured to the secondary frame or lens. The opposite end 43 of the arm or the free end of the arm is securable to the primary frame at the corbel 22. The free end of the arm may be provided with a magnetic member that is removably securable to the magnetic member 30 on the corbel 22 of the primary frame. In one embodiment, the free end of the arm may be in the form of a flat disk 45 having a top surface 44 and a bottom surface 46. There may also be one or more side surfaces 47. The bottom surface of the flat disk may be provided with a magnetic member that is removably securable to the magnetic member of the corbel. In another embodiment the surface of the magnetic members may be roughened to increase the co-efficient of friction between the magnetic member on top surface of the corbel and the magnetic member of the free end of the arm.

In one embodiment, the top surface of the generally flat disk and the bottom of the flat disk may be angled with respect to each other, as seen in FIGS. 3 and 4 so that distance from the top surface of the disk is less at the end of the disk 48 further from the arm. The disk may also have a transition member 49 extending from the bottom surface 46 of the disk to the bottom surface of the arm 50. The arrangement so described gives the flat disk 45, an inner edge portion 51 and an outer edge portion 52.

The distance between the top surface and the bottom surface at the inner edge portion is greater than the distance from the top surface to the bottom surface at the outer edge portion. This arrangement gives the bottom surface of the flat disk a tapered profile. It will be appreciated by those skilled in the art that the shape of the free end of the arm can vary as long as the bottom surface of the free end and the top surface of the corbel provide sufficient area of contact so that the two contacting surfaces of the magnetic member may be removably secured together by the magnetic force.

The angled position of the top and bottom surface of the corbel and the free end of the arm respectively make it more difficult for the secondary frame to unintentionally slide off of the primary frame. It will be appreciated that where the top surface of the corbel and the bottom surface of the free end of the arm are generally in a horizontal plane when connected together there is risk that a sudden outward force on the secondary frame could increase the possibility that the secondary frame could move outwardly of the primary frame thereby causing the magnetic member of the secondary frame to become released from the magnetic member of the primary frame. The top surface of the corbel and the bottom surface of the free end of the arm being at an angle reduces the risk of the secondary frame coming free in such a situation. Thus, in order for the secondary frame to be removed from the primary frame, more than an incidental outward force would typically be necessary. The force to remove the secondary frame from the primary frame would need to be an outward force to break the magnetic bond between the two magnetic members and an upward force to raise the arm from the corbel. It will be appreciated the greater the angle of the top surface of the corbel and the bottom surface of the free end of the arm are from the horizontal, the more force that will be required to raise the secondary frame from the primary frame.

The top surface of the corbel in the FIGS. 3 and 4 show a generally square configuration for the top surface. This is to facilitate accommodation of the magnet in the corbel. However other configurations are possible. In fact, the surface of the magnet can extend past the top surface of the corbel on one or more sides if desired. The top surface can be virtually any suitable shape provided that there is sufficient surface area for the magnetic member to fulfill its function. Thus, the top member can be generally U-shaped as the area at the top of the U is connected to the frame and the curved end of the U is opposite the frame. The sides of the corbel may also be generally U-shaped in the cross section as the corbel tapers down the inside surface of the primary frame.

While both corbels are shown to have the same shape they do not have to be and each can have a different configuration. Similarly the body of the corbel is shown as tapering as it extends from the top surface downwardly. However, one or both of the sides of the corbel can be generally vertical as they extend downward and there can be a bottom surface that is generally horizontal or the bottom surface can have the same angle as the top surface or an angle that forms a trapezoidal corbel. In fact the bottom surface could have any angle.

As seen in the FIGS. 3 and 4 the corbel has two free sides 24 and 25 and a top surface 23. The first free side 24 while is the from surface of the corbel and which extends downwardly from the outer edge 27 of the top surface 23 that extends from the inner surface 21 of the primary frame. There is in the FIGS. 3 and 4 a second free side 2 which is the side or surface 25 of the corbel. This side surface extends generally perpendicular to the rear surface of the primary frame and at generally a right angle to the side edge of the top surface. The side surface 25 is also shown perpendicular to the front surface 24. The other sides of the corbel are shown in the Figures as being integral with the portion of the primary frame that extends from the rear surface of the frame rearwardly to the temples as well as the rear surface of the primary frame. While the corbel is secured to the frame on two sides of the corbel it is also possible to have the corbel secured only to the rear surface of the frame or to the surface of the primary frame extensions 15 and 16 so that the corbel has three free sides. Thus, the frame in this embodiment has the corbel secured to it on only one free side.

Although the primary frame is shown with a corbel positioned on the inside surface it would be appreciated that other ways of accomplishing the results of the corbel are also possible. For example there can just be a surface member 23 in the form of a thin plate extending outwardly from an inner surface 21 of the primary frame. The surface member 23 can generally have an upper surface which may preferably be flat. The upper surface of the surface member 23 may have a magnetic member secured to the upper surface by any appropriate means. In one embodiment, there can be a flat surface member with a generally flat disk or strip of a magnetic member secured to the flat surface. The flat surface may have a first side edge that extends outwardly from the rear surface of the primary frame. There may be a second edge that extends from the end of the first edge opposite the end secured to the frame or it may be secured to another edge of the top disk or strip. As noted above, the end of the edge secured to the frame may be secured to the rear of the primary frame or it may be secured to a side extension that has a hinge connected to it to which the temples are attached.

Another embodiment of the invention is shown in FIGS. 5-8. In this embodiment there is an eyeglass device where the secondary lens assembly has an arm that goes under the primary lens assembly where each arm is secured by a magnetic member to an inverted corbel on the interior surface of the primary lens assembly. In the embodiment of FIGS. 5-8 there is a primary spectacle frame 110 for supporting usually at least one primary lens and more commonly two lenses 111 The primary spectacle 110 frame typically may have a pair of lenses separated by a bridge or brow bar 112 for resting the eyewear assembly on the nose of a user. The primary lens assembly 110 also has two temples 113 and 114 or ear stems that are connected to the respective lenses by suitable means. The temples are preferably hingedly connected to the lenses or the frame. The primary spectacle frame 110 may also include two side portions or extensions 115 and 116, more preferably a left side and a right side extension that extend generally rearwardly from the outer side edges 117 and 118 of the frame. The side edges 117 and 118 of the frame may have a body portion 119 that extends outwardly of the frame. One end of the body portion 119 is secured to the frame and the other end has an extension extending rearwardly or toward the ears of a user. Hingedly attached to the extensions 115 and 116 are temples or ear stems 113 and 114. Alternatively, the temples may be secured to the lenses, the frame or the extensions.

Each of the temples or ear pieces 113 and 114 are preferably pivotally mounted to the frame, the lenses or the side extensions 115 and 116.

Figure 7:
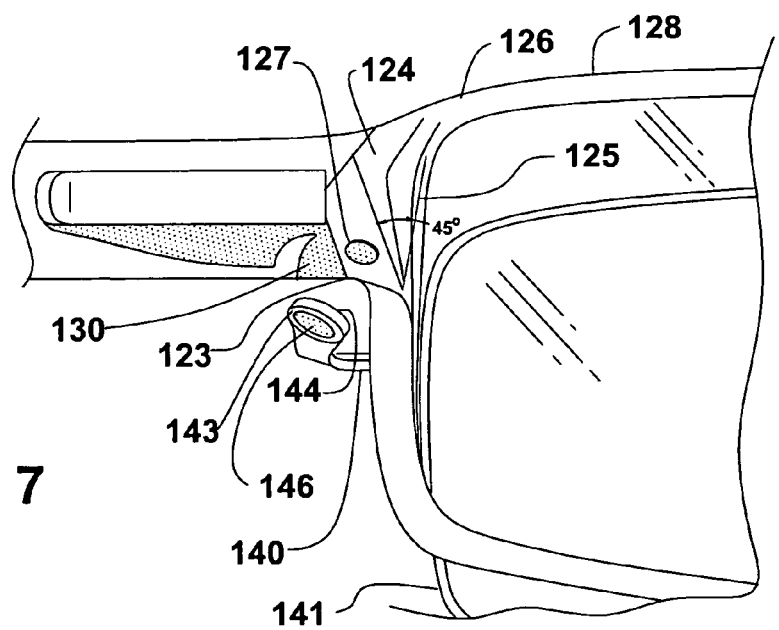
FIG. 7 is an exploded view of the secondary lens assembly in position above the left side of the primary lens assembly as viewed by a wearer.
Figure 8:
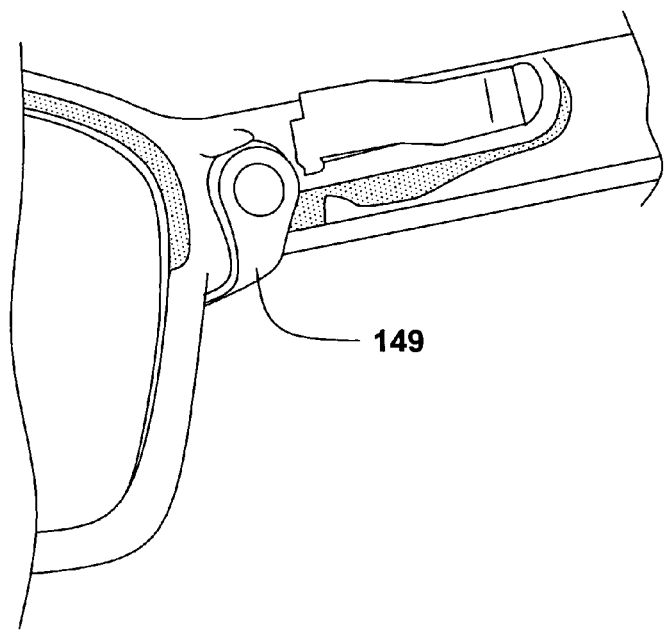
FIG. 8 is a right side view of the secondary lens assembly in position above the left side of the primary lens assembly as viewed by a wearer.
Figure 9:
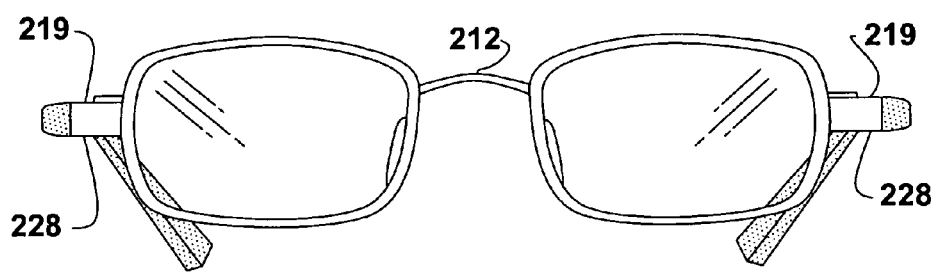
FIG. 9 is a front view of an alternate embodiment of the present invention which may preferably be used in metal frames where the secondary lens assembly is positioned over a primary lens assembly.
Figure 10:
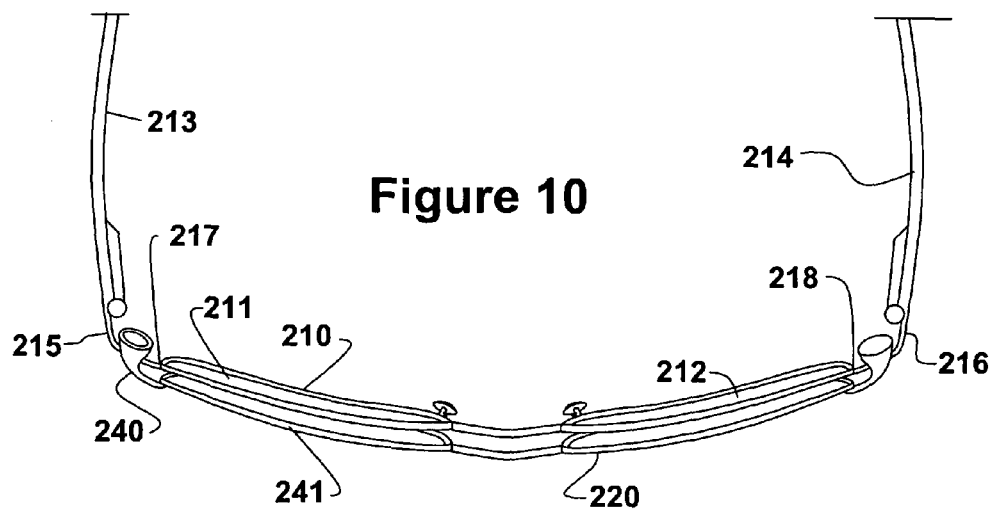
FIG. 10 is a top view of the eyewear assembly of FIG. 9.

The secondary lens assembly 120 may be removably secured to the primary lens assembly. As seen in FIGS. 7 and 8, on the inner or inside surface of the primary frame 121 there is at least one inverted corbel 122 secured to the frame. The inverted corbel 122 may be formed integral with the frame or it may be a separate member that is secured to the frame by any suitable means. Preferably, the inside surface of the frame has at least two corbels, each at opposite ends of the frame. The corbel 122 may have a bottom surface 123, a front sidewall 124 and at least one side surface 125. The top surface 123 is generally a flat region that may be generally horizontal or it may be angled as desired. In a preferred embodiment, the bottom surface is angled such that it is about 45° of vertical axis 126. The angle can range from about 5° of vertical axis to up to generally horizontal. The bottom surface of the corbel extends outwardly of the rear or inner surface 121 of the frame between one of the lenses in the frame and the outer end or edge of the frame. The bottom surface 123 of the corbel ends in an edge 127 where the front sidewall 124 connects to the bottom surface 123. The front sidewall 124 extends downwardly and outwardly generally from the top surface 128 of the lens frame and may be generally vertical in, for example, roughly the same plane as or a parallel plane to the axis 126 or it may angle outwardly from the inside surface of the frame. The inverted corbel 122 may have a pair of side surfaces or there may only be a single exposed side surface 125 with the opposite side of the corbel integral with the inner surface 129 of the extensions 115 and 116 portions of the frame.

The bottom surface 123 of the inverted corbel 122 may be provided with a securing means 130 for securing the secondary frame to the primary frame. The bottom surface 123 of the inverted corbel 122 may be provided with a magnetic member 130.

The secondary lens assembly 120 may be secured to the primary lens assembly by means of an arm 140 extending from a surface of the secondary frame or lens. Preferably, the arm extends from a side portion 141 of the secondary frame, but it will be appreciated that the arm can extend from other areas on the secondary eyewear assembly as well. One end 142 of the arm is secured to the secondary frame or lens. The opposite end 143 of the arm or the free end of the arm is securable to the primary frame at the inverted corbel 122. The free end of the arm may be provided with a magnetic member that is removably securable to the magnetic member 130 on the inverted corbel 122 of the primary frame. In one embodiment, the free end of the arm may be in the form of a flat disk 145 having a top surface 144 and a bottom surface 146. There may also be one or more side surfaces 147 on the disk. The top surface of the flat disk may be provided with a magnetic member that is removably securable to the magnetic member of the inverted corbel. The disk may also have a transition member 149 extending from the bottom surface 146 of the disk to the bottom surface of the arm 150. The arrangement so described gives the flat disk 145, an inner edge portion 151 and an outer edge portion 152. The distance between the top surface and the bottom surface at the inner edge portion is greater than the distance from the top surface to the bottom surface at the outer edge portion. This arrangement gives the top surface of the flat disk a tapered profile. It will be appreciated by those skilled in the art that the shape of the free end of the arm can vary as long as the top surface of the free end and the bottom surface of the inverted corbel provide sufficient area of contact so that the two contacting surfaces of the magnetic member may be removably secured together by the magnetic force.

The bottom surface of the corbel in the Figure shows a generally square configuration for the top surface. This is to facilitate accommodation of the magnet in the corbel. However other configurations are possible. The bottom surface can be virtually any suitable shape provided that there is sufficient surface area for the magnetic member to fulfill its function.

While both inverted corbels are shown to have the same shape they do not have to be and each can have a different configuration. Similarly the body of the corbel is shown as tapering outwardly as it extends from the top surface downwardly. However, the sides of the corbel can preferably be generally vertical as they extend downward and there can be a top surface that is generally horizontal or it can have the same angle as the bottom surface or an angle that forms a trapezoidal corbel. In fact the top surface could have any angle.

As seen in the FIGS. 7 and 8 the corbel has two free sides or faces 124 and 125 and a bottom surface 123. The first free side 124 extends downwardly from generally in the region of the top surface or the frame 128 and extends outwardly from the inner surface 121 of the primary frame. There is in the FIGS. 7 and 8 a second free side 125 which is the side surface of the inverted corbel. This side surface 125 extends generally perpendicular to the rear surface of the primary frame and at generally a right angle to the side edge of the bottom surface 123. The side surface 125 is also shown perpendicular to the front surface 124. The other sides of the corbel are shown in the Figures as being integral with the portion of the primary frame that extends from the rear surface of the frame rearwardly to the temples as well as the rear surface of the primary frame. While the corbel is secured to the frame on two sides of the corbel it is also possible to have the inverted corbel secured only to the rear surface of the frame or to the surface of the primary frame extensions 115 and 116 so that the inverted corbel has three free sides. Thus, the frame in this embodiment has the inverted corbel secured to it on only one free side.

Although the primary frame is shown with an inverted corbel positioned on the inside surface it would be appreciated that other ways of accomplishing the results of the inverted corbel are also possible. For example there can just be a surface member 123 in the form of a thin plate extending outwardly from an inner surface 121 of the primary frame. The surface member 123 can generally have a bottom surface which may preferably be flat. The bottom surface of the surface member 123 may have a magnetic member 130 secured to the surface by any appropriate means. In one embodiment, there can be a flat surface member with a generally flat disk or strip of a magnetic member secured to the flat surface. The flat surface may have a first side edge that extends outwardly from the rear surface of the primary frame. There may be a second edge that extends from the end of the first edge opposite the end secured to the frame or it may be secured to another edge of the top disk or strip. As noted above, the end of the edge secured to the frame may be secured to the rear of the primary frame or it may be secured to a side extension that has a hinge connected to it to which the temples are attached.

A further embodiment of the present invention is shown in FIGS. 9-14. In these figures there is an eyeglass device where a preferred material used in the frame for the lenses is metal. It will be appreciated by those skilled in the art that the teachings of the present invention are equally applicable to frameless eyeglass assemblies as well as eyeglass assemblies where the frame contacts only a portion of the lenses. There may be a primary spectacle frame 210 for supporting usually at least one primary lens and more commonly two lenses 211 The primary spectacle 210 frame typically may have a pair of lenses separated by a bridge or brow bar 212 for resting the eyewear assembly on the nose of a user. The primary lens assembly 210 also has two temples 213 and 214 or ear stems that are connected to the respective lenses by suitable means. The temples are preferably hingedly connected to the lenses or the frame. While the primary spectacle frame 210 may be made of any suitable material, the preferred material is metal. The eyewear of the present embodiment may also be "rimless" i.e. where the temples and the bridge are directly secured to the lenses with threaded fasteners, posts and the like. The primary spectacle frame 210 may also include two side portions or extensions 215 and 216, more preferably a left side and a right side extension that extend generally rearwardly from the outer side edges 217 and 218 of the frame. The side edges 217 and 218 of the frame may have a body portion 219 that extends outwardly of the frame. One end of the body portion 219 is secured to the frame and the other end has an extension 215 or 216 extending rearwardly or toward the ears of a user. Hingedly attached to the extensions 215 and 216 are temples or ear stems 213 and 214. Alternatively, the temples may be secured to the lenses, the frame or the extensions.

There are many well-known methods of attaching temples to the frame, lens or the side extensions 215 and 216. The temples can be configured in any suitable manner. An additional bridge can also be provided in addition to or as a alternative to the brow bar 212. The lens holding structures are sized and configured to receive a pair of lenses. Each of the temples or ear pieces 213 and 214 are preferably pivotally mounted to the frame by a suitable hinge means, the lenses or the side extensions 215 and 216.

The secondary lens assembly 220 may be removably secured to the primary lens assembly by a variety of means. In one embodiment of the present invention, the primary lens assembly may have at least one corbel 222 that facilitates securing the secondary lens assembly to the primary lens assembly.

Figure 11:
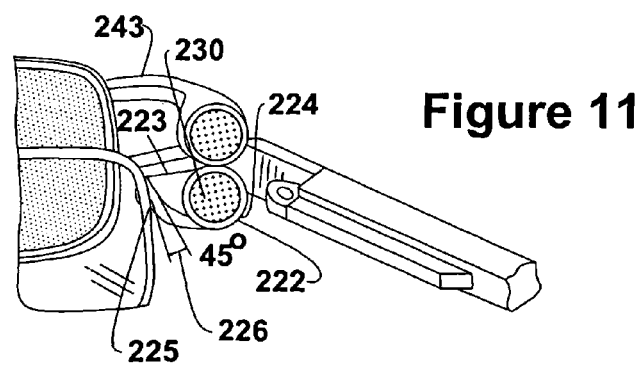
FIG. 11 is a side top rear view of the right side of the lens assembly with the secondary lens assembly above the primary lens assembly.
Figure 12:
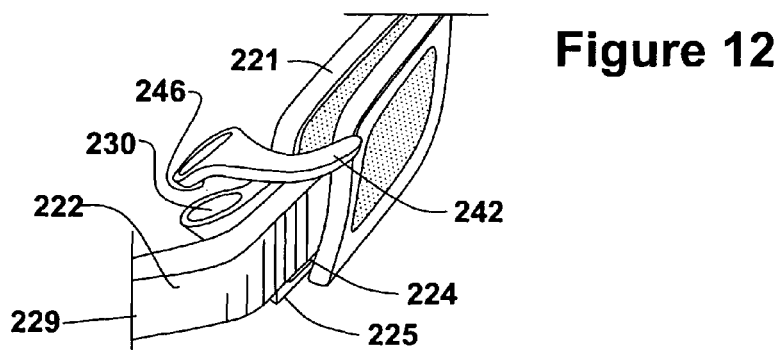
FIG. 12 is an inside top view of the right side of the lens assembly with the secondary lens assembly above the primary lens assembly.
Figure 13:
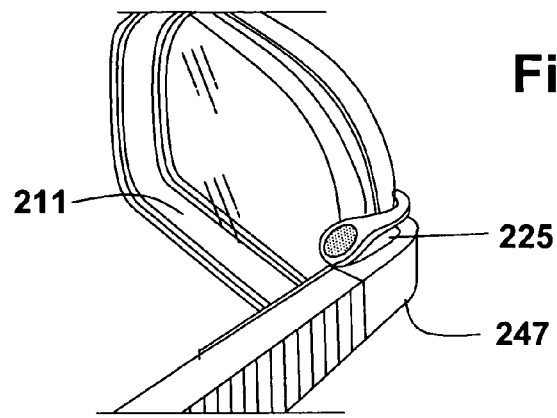
FIG. 13 is a top view of the assembly of FIG. 12 from towards the front side of the assembly.
Figure 14:
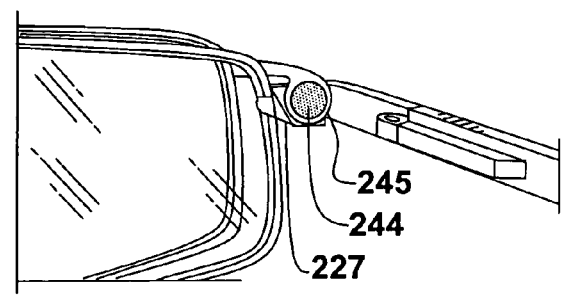
FIG. 14 is a rear view of the right side with the secondary lens assembly in position on the primary lens assembly.
Figure 15:
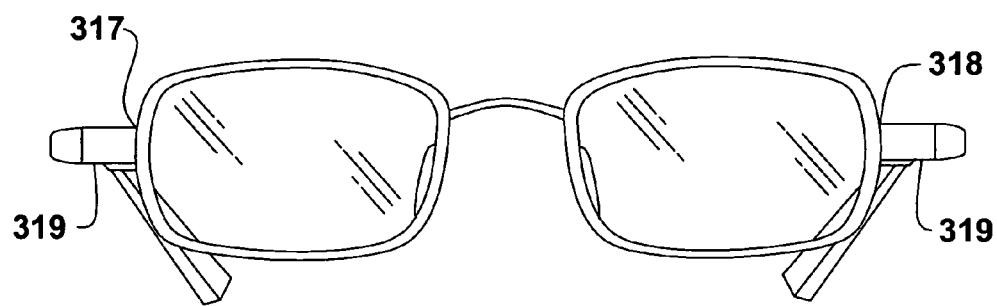
FIG. 15 is a front view of an alternate embodiment of the assembly of FIG. 9 which may preferably be used in metal frames where the secondary lens assembly is positioned over a primary lens assembly.
Figure 16:
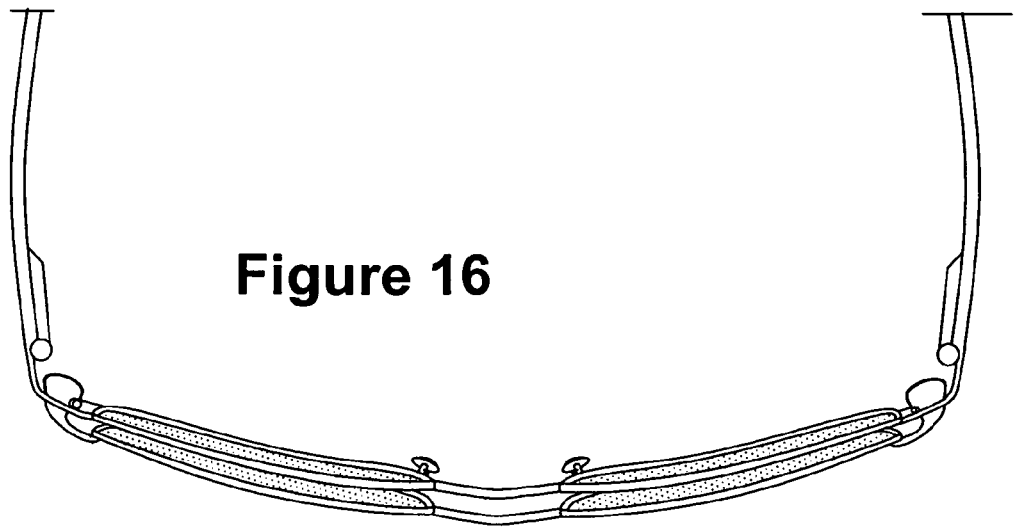
FIG. 16 is a top view of the eyewear assembly of FIG. 15.

As seen in FIGS. 11 and 12, on the inner or inside surface 221 of the body portion 219 on the primary frame there is at least one corbel 222 secured to the body portion 219. The corbel 222 may be formed integral with the frame or it may be a separate member that is secured to the frame by any suitable means. Preferably, the inside surface of the frame has at least two corbels, each at opposite ends of the frame. The corbel 222 may have a top surface 223 which may, if desired, be flush with the top surface of the body portion 219. There is a front sidewall 224 and at least one side surface 225. The top surface 223 is generally a flat region that may be generally horizontal or it may be angled as desired. In a preferred embodiment, the top surface is angled such that it is about 45° of vertical axis 226. The angle can range from about 5° of vertical axis to up to generally horizontal. The top surface 223 of the corbel extends outwardly of the rear or inner surface 221 of body portion 219 on the frame between one of the lenses in the frame and the outer end or edge of the frame. The front sidewall 224 extends downwardly toward the bottom surface or edge 228 of the frame and may be generally vertical or it may angle outwardly of the frame. The corbel may be flush with the extensions 215 or 216 or it may be separated therefrom.

The front surface 223 of the corbel 222 may be provided with a securing means 230 for securing a secondary frame to the primary frame. The securing means may be any suitable means of connecting a secondary frame or a portion thereof to the top surface of the corbel. In a preferred embodiment, the front surface 223 of the corbel 222 may be provided with a magnetic member 230 which may be a magnet or a material attracted to a magnet. In one embodiment, the magnetic member may be a disk secured to the surface of the corbel. In another embodiment, the magnetic member may be a short pin or rod that is inserted into a recess or orifice in the front surface of the corbel. The pin or rod may be any suitable shape or design and may be secured to the orifice by an adhesive or other suitable means.

The secondary lens assembly 220 may be secured to the primary lens assembly by means of an arm 240 extending from a surface of the secondary frame or lens. Preferably, the arm extends from the top portion 241 of the secondary frame, but it will be appreciated that the arm can extend from other areas on the secondary eyewear assembly as desired. One end 242 of the arm is secured to the secondary frame or lens. The opposite end 243 of the arm or the free end of the arm is securable to the primary frame at the corbel 222. The free end of the arm may be provided with a magnetic member that is removably securable to the magnetic member 230 on the corbel 222 of the primary frame. In one embodiment, the free end of the arm may be in the form of a flat disk 245 having a top surface 244 and a bottom surface 246. There may also be one or more side surfaces 247. The bottom surface of the flat disk may be provided with a magnetic member that is removably securable to the magnetic member of the corbel. It will be appreciated by those skilled in the art that the shape of the free end of the arm can vary as long as the bottom surface of the free end and the top surface of the corbel provide sufficient area of contact so that the two contacting surfaces of the magnetic member may be removably secured together by the magnetic force. The angled position of the top and bottom surface of the corbel and the free end of the arm respectively make it more difficult for the secondary frame to unexpectedly slide off of the primary frame.

The top surface of the corbel in the Figure shows a generally circular configuration for the front surface. This is to facilitate accommodation of the magnet in the corbel. However other configurations are possible. The front surface can be virtually any suitable shape provided that there is sufficient surface area for the magnetic member to fulfill its function.

While both corbels are shown to have the same shape they do not have to be and each can have a different configuration. Similarly the body of the corbel is shown as tapering as it extends from the top surface downwardly. However, the front side 224 of the corbel can be generally vertical as it extends downward and there can be a bottom surface 227 that is generally horizontal or the bottom surface can have the same angle as the front surface or an angle. In fact, the bottom surface could have any angle.

As seen in the FIGS. 11 and 12 the corbel has three free sides 224, 225, 229, a top surface 223 and a bottom surface 227. While the corbel is secured only to the rear surface of the frame, the corbel could be secured to the inside surface of the primary frame extensions 215 and 216 so that the corbel has only two free sides.

Although the primary frame is shown with a corbel positioned on the inside surface it would be appreciated that other ways of accomplishing the results of the corbel are also possible. For example there can just be a surface member 224 in the form of a tongue extending outwardly and downwardly from an inner surface 221 of the primary frame. The upper surface may have a magnetic member secured to the upper surface by any appropriate means. In one embodiment, there can be a flat surface member with a generally flat disk or strip of a magnetic member secured to the flat surface.

FIGS. 15-19 show an embodiment similar to the embodiment of FIGS. 9-14 in that the embodiment of these figures are directed primarily to a metal frame. In the embodiment of FIGS. 15-19 the arm 340 extending from the secondary frame passes under the body portion 319 that extends outwardly from the outer side edges 317 and 318 of the frame of the primary lens assembly.

In this embodiment there is an inverted corbel 322 that has a top surface, a front side or face 324, a side wall 325. The top surface extends outwardly from the inside surface of the body portion 319. From the top surface, the front face 324 extends downwardly at an angle from the top surface to the bottom surface 328. The angle of the front face is preferably at about 45° to the vertical plane formed by the inside surface of the frame body portion 319. This angle can range from 5° to 85°, more preferably from about 30° to about 60°. A magnetic member 330 may be secured to the surface of an inverted corbel 322.

Figure 17:
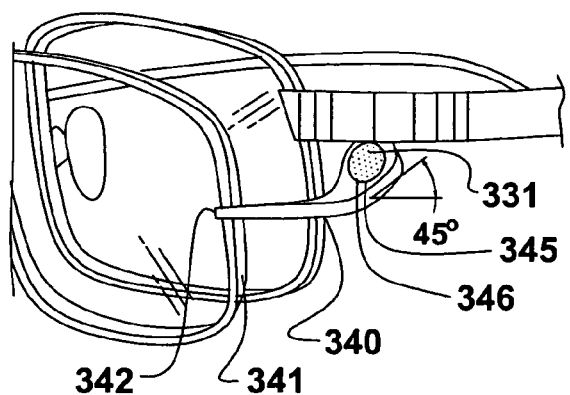
FIG. 17 is a front side rear view of the left side of the lens assembly with the secondary lens assembly in front of the primary lens assembly.
Figure 18:
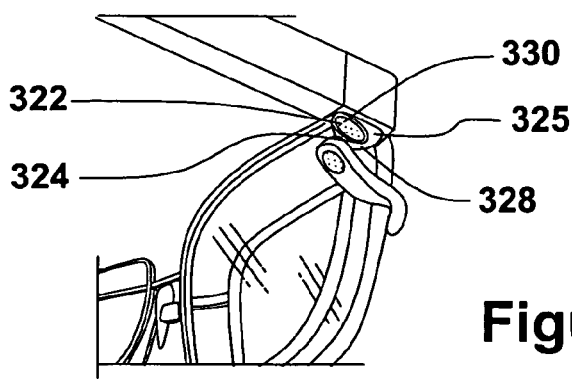
FIG. 18 is an inside top view of the right side of the lens assembly with the secondary lens assembly above the primary lens assembly.
Figure 19:
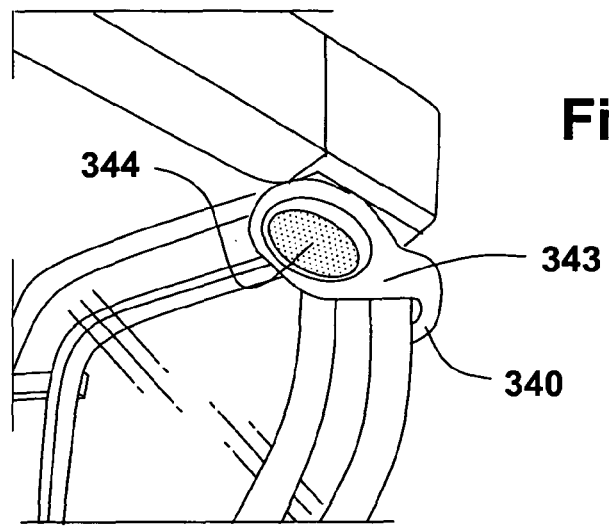
FIG. 19 is a close-up view of the assembly of FIG. 15 with the secondary lens assembly in position over the primary lens assembly.
Figure 20:
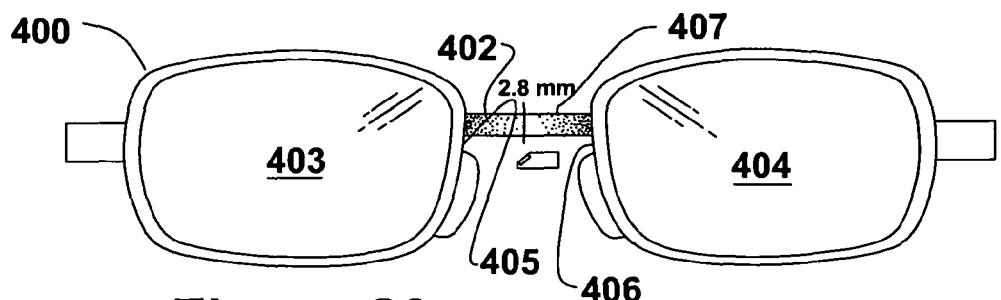
FIG. 20 is a front view of a primary lens assembly of an alternative embodiment of the present invention.

The secondary lens assembly 320 may be secured to the primary lens assembly by means of an arm 340 extending from a surface of the secondary frame or lens. Preferably, the arm extends from a side portion 341 of the frame, but it will be appreciated that the arm can extend from other areas on the secondary eyewear assembly as desired. One end 342 of the arm is secured to the secondary frame or lens. The opposite end 343 of the arm or the free end of the arm is securable to the primary frame at the inverted corbel 322. The free end of the arm may be provided with a magnetic member 331 that is removably securable to the magnetic member 330 on the corbel 322 of the primary frame. In one embodiment, the free end of the arm may be in the form of a flat disk 345 having a top surface 344 and a bottom surface 346. There may also be one or more side surfaces 347. The top surface of the flat disk may be provided with a magnetic member 331 that is removably securable to the magnetic member of the inverted corbel. In one embodiment, the top surface of the generally flat disk and the bottom of the flat disk may be angled with respect to each other, as seen in FIGS. 17 and 18. It will be appreciated by those skilled in the art that the shape of the free end of the arm can vary as long as the top surface of the free end and the bottom surface of the inverted corbel provide sufficient area of contact so that the two contacting surfaces of the magnetic member may be removably secured together by the magnetic force.

Figure 20A:
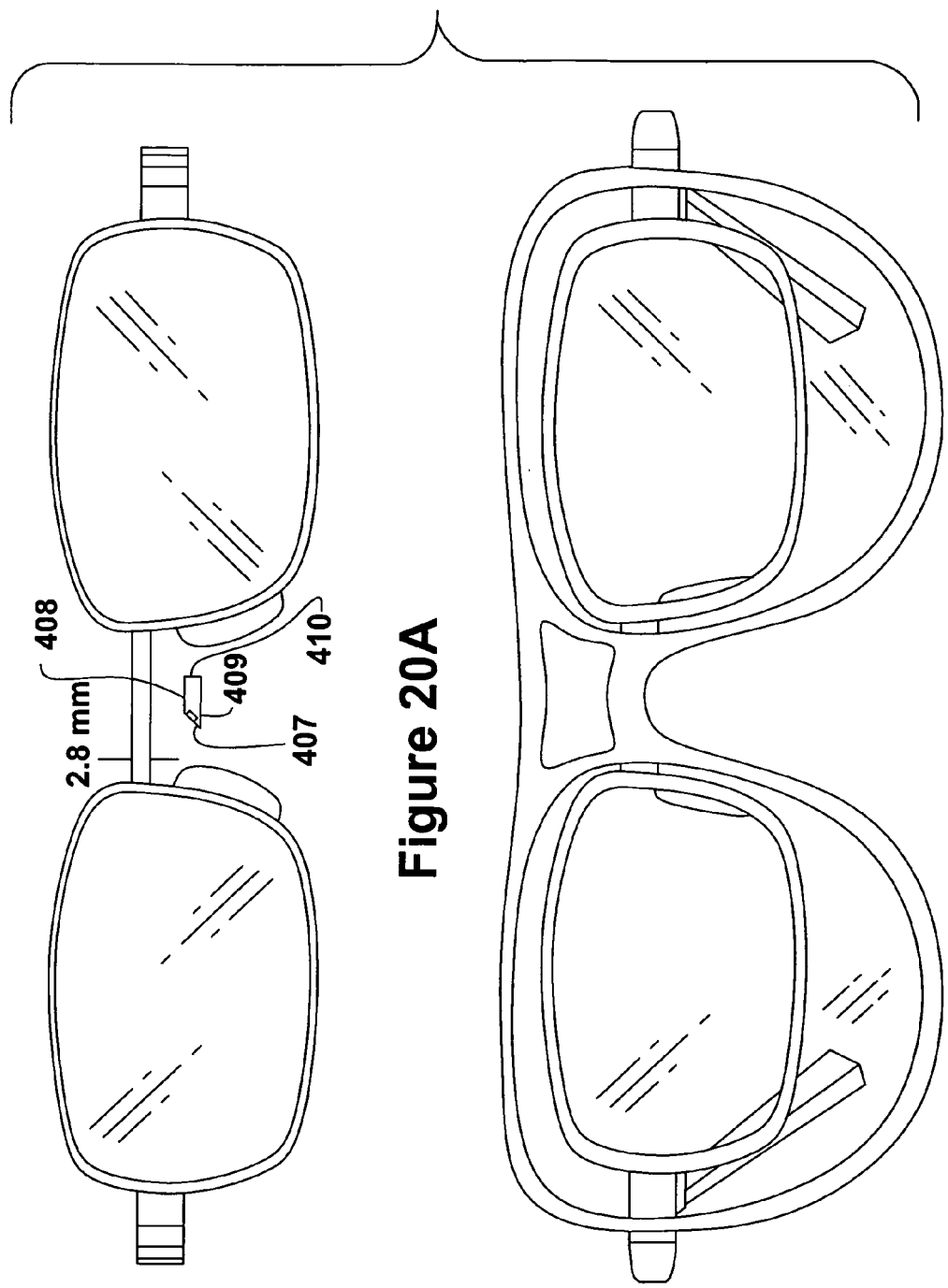
FIG. 20A is a cross section of the bridge member shown in FIG. 20.
Figure 22:
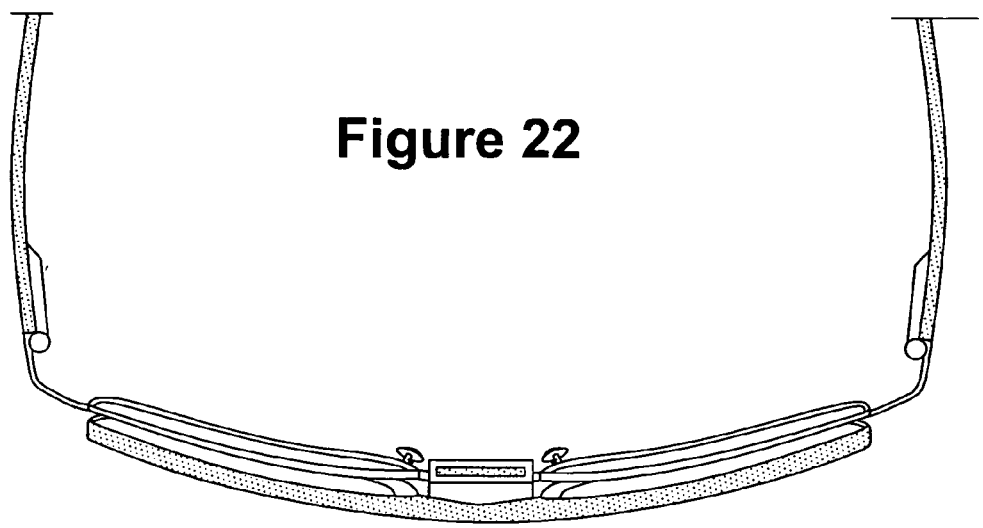
FIG. 22 is a top view of the eyewear assembly of FIG. 21.
Figure 23:
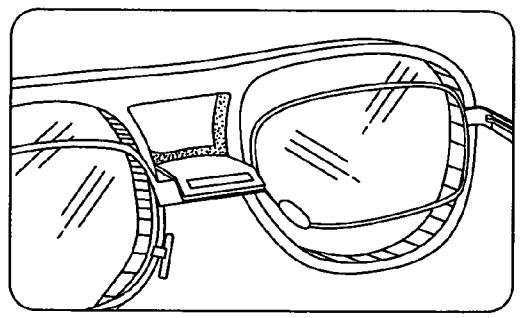
FIG. 23 is a rear view of the assembly of FIG. 22.
Figure 24:
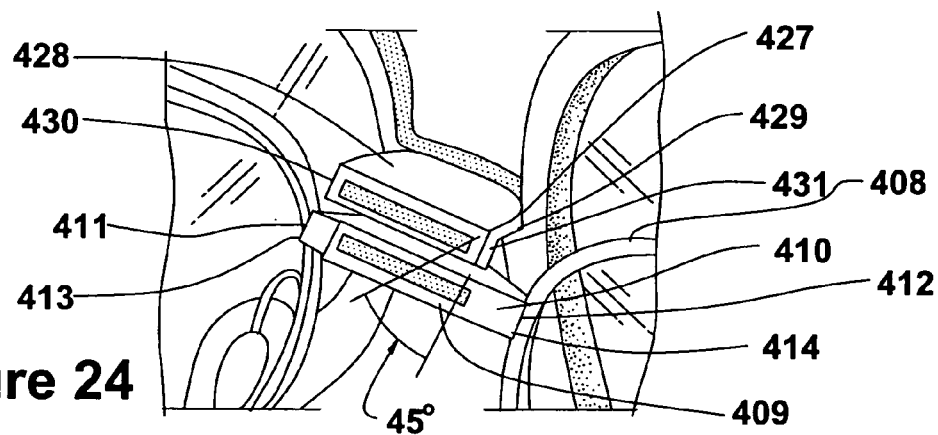
FIG. 24 is a rear view of a portion of the primary lens assembly with the secondary lens assembly in position above the primary lens assembly.
Figure 25:
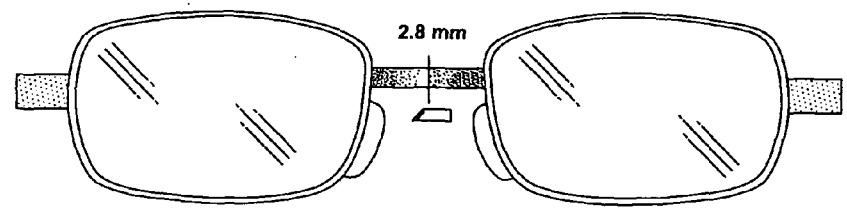
FIG. 25 is a front view of a primary lens assembly of an alternative embodiment of the present invention.
Figure 26:
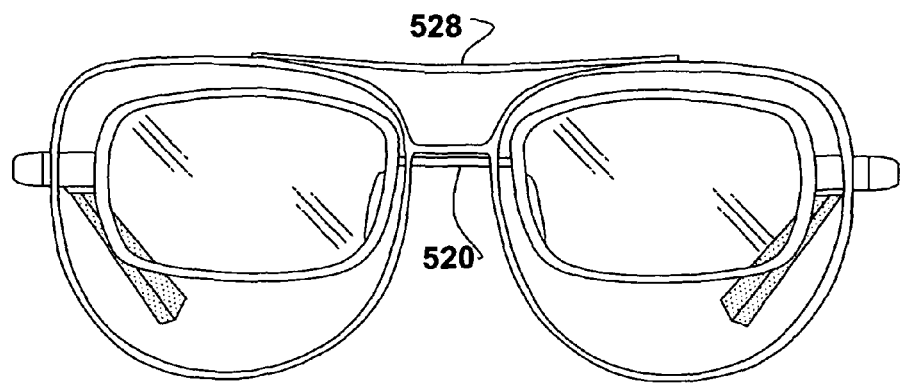
FIG. 26 is a front view of an eyewear assembly of the present invention where there is a secondary lens assembly in position over a primary lens assembly.
Figure 27:
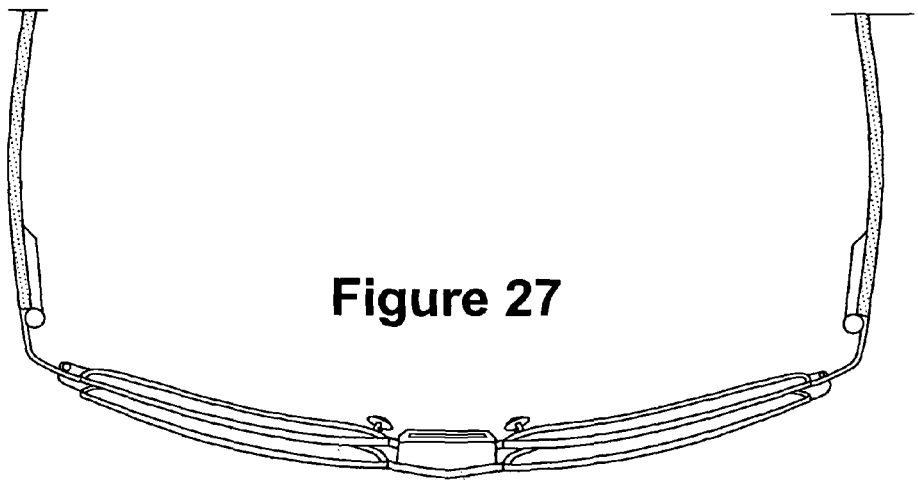
FIG. 27 is a top view of the eyewear assembly of FIG. 26.
Figure 28:
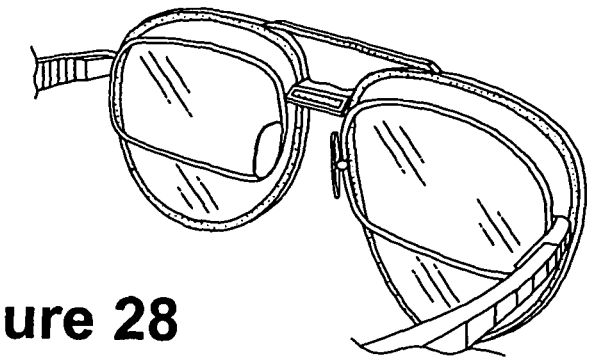
FIG. 28 is a rear view of the assembly of FIG. 27.
Figure 29:
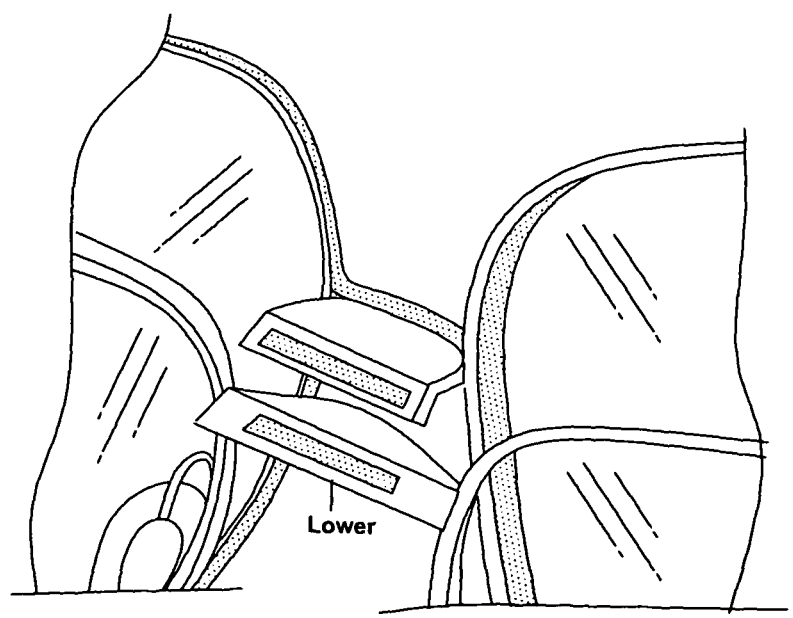
FIG. 29 is a front view of a portion of the primary lens assembly with the secondary lens assembly in position above the primary lens assembly.

In an alternative embodiment of the present invention shown in FIGS. 21-24 there is a primary frame 400 and a secondary frame 401. The primary frame has a bridge member 402 that extends generally from one lens 403 to the second lens 404. The bridge 402 may be secured to each lens or it may be secured to at least a portion of the frame that supports the lens. The bridge 402 may be the sole member extending between the two lenses or there may be more than one additional bridge members. The bridge member 402 of the present invention may be a magnetic member or may have at least one magnetic member on the bridge member. In a preferred embodiment the bridge member on the primary lens may be a longitudinal member extending from one lens to the other lens. Where there is a plastic or other type of frame the bridge member 402 extends from one inner edge 405 of the frame to the opposite inner edge 406. The bridge member 402 preferably has a cross section as seen in FIG. 20A. The cross section of the bridge member 402 is preferably in the form of a right angle trapezoid where in there is a first side 407 which forms the outer surface of the bridge member 402. There is a top surface 408 and a bottom surface 409 that are generally parallel to each other and perpendicular to outer surface 407. There is also a rear surface 410 that is generally at a right angle to the bottom surface of 408 of the bridge member. It will be appreciated by those skilled in the art that the angles of formed by the different surfaces of the trapezoid can vary. The first side 407 need not be perpendicular to one or both of top and bottom surfaces 408 and 409 similarly the angles formed by rear surfaces 410 and the top and bottom surface 408 and 409 can vary plus or minus 15-25° or so. The rear surface 410 may be a magnetic member or it may be made from some other suitable material and have at least one magnetic member on the upper surface thereof. The magnetic member may be a strip or it may be any suitable shape or a series of magnetic members along the rear surface 410 as seen in FIG. 24 the magnetic member is a strip or block of one or members that are positioned in a recess in the rear surface 410 of bridge member 402. The magnetic member may be any desired shape and it may be also positioned on the surface of the rear surface 410 as opposed to being inserted into a recess of the bridge member 402.

In FIG. 24 a strip of a magnetic material can be positioned on the generally diagonal sheet of material that extends from one lens to the other lens to form the rear surface 410. Although the sheet forming the bridge may be secured to the lenses, in an alternative embodiment the sheet material forming the bridge may be secured to the frame. In a preferred embodiment the bridge member has a first end 411 and a second end 412. The first bridge member extends from one side of lens or frame member to the opposite lens or frame member. The ends 411 and 412 of the bridge member have a tongue 413 and 414 that is secured to the rear surface of the frame. The rear surface 410 of the bridge member extends generally downwardly from the top surface of the bridge member at an angle of about 135° from the underside of the top surface of the bridge member. The top surface 408 of the bridge member forms a ledge or resting surface for a portion of the bridge member of the secondary frame 401.

Figure 21:
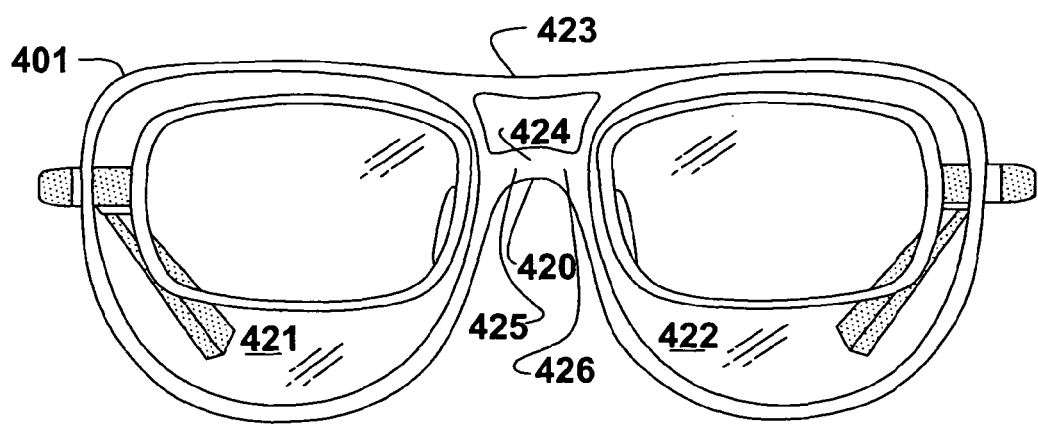
FIG. 21 is a front view of an eyewear assembly of the present invention where there is a secondary lens assembly in position over a primary lens assembly.

The secondary lens assembly in this embodiment of FIGS. 20-24 has a first lens 421 and a second lens 422 secured to each other by a bridge member lens assembly 420. The bridge member 420 may extend from one lens to the other lens on the secondary lens assembly or the bridge member may extend from the frame for one lens to the frame for the opposite lens. The bridge on the secondary lens assembly may be a single member or it may be two or more members 420 and 423. As shown in FIGS. 21 and 24 there is a bridge member 420 extending from the frame portion of one lens 421 to the frame portion of the other lens 422. The bridge has a top surface 424, a front surface 425, and a bottom surface 426. Extending outwardly from the rear surface 427 is a longitudinal plate 428 which extends generally horizontally from the rear surface of the bridge. The longitudinal plate 428 has a generally flat under surface 429 from where it is secured to the bridge to where it contacts the angled member 430. The angled member 430 extends outwardly from the horizontal member 428 and is angled downwardly with respect to the horizontal member 428. The bottom surface 431 of angled member 430 mates with the rear surface 410 of the bridge member 402. Thus, the angle of the rear surface 410 with respect to the top surface 408 of the bridge member 402 should correspond to the angle of the bottom surface 431 of the angled member 430. In a preferred embodiment the top surface 408 of the bridge member 402 may also contact the bottom surface 429 of horizontal member 428 and top surface 408 are shown generally horizontal it is not required that they have this configuration as long as under surface 431 contacts top surface 410. The preferred angle of the top surface 410 and bottom surface 431 is 135° to the underside 429 of the horizontal member 428 or 225° to the top surface of the horizontal member 428. The preferred angle for the angle member 430 with respect to the horizontal member 428 can range from an angle about 90° to the underside of the horizontal member 428 to about 175° to the underside 429. A more preferred angle is 125° to 150°. A most preferred range is 130° to 140°. The bottom surface 431 of the angled member 430 is preferably provided with a magnetic member. The magnetic member is positioned on the angled member so that the magnetic member contacts at least a portion of the magnetic member on the bridge 402 of the primary lens or assembly. The magnetic member of the secondary lens assembly contacts the magnetic member on the primary lens assembly and provides a magnetic force to secure the two assemblies together. The angled members on each assembly also help prevent removal of the secondary frame assembly from the primary frame assembly. The angled surface reduces the ability of the secondary frame assembly to slide off of the primary.

An alternative embodiment is shown in FIGS. 25-29. The embodiment shown in FIGS. 21-24 the bridge member 420 on the secondary lens assembly is made of a first material such as plastic and the horizontal member 428 is made of a different material such as metal. In the assembly shown in FIGS. 25-29 the bridge member 520 on the second lens assembly has an integral horizontal member 528 may be made of the same material as the bridge member 520 on the secondary lens assembly.

The subframe assembly or secondary frame assembly in this embodiment has a front surface and a rear surface. The subframe assembly has an arm extending rearwardly from the secondary frame assembly. The arm has a first end secured to the secondary frame assembly and a second end opposite thereto. The free end of the arm has a magnetic member secured thereto that is on the top surface thereof so it can contact the magnetic member on the bottom surface of the protruding member. The free end of the arm has a tongue which has a top surface, a bottom surface and at least one sidewall. A magnetic member has a contact surface on the tongue which contacts the magnetic member of the bottom surface of the corbel or protruding member in this embodiment. The tongue is preferably at an angle to the arm. The angle may be 5 to 90° of the top surface of the arm where the arm is generally horizontal.

FIGS. 25-29 are similar to FIGS. 21-24. In FIGS. 21-24 the secondary lens assembly has a frame and the bridge member is a separate member secured to the inside surface of the bridge of the secondary lens assembly. The arrangement of FIGS. 21-24 is preferably used where the frame of the secondary lens assembly is made from one material such as plastic and the bridge member is made from a different material such as metal.

The embodiment of FIGS. 25-29 shows a secondary lens assembly where the bridge member is integral with the bridge.

What is claimed is:

1. An eyeglass assembly comprising a frame assembly and a subframe assembly, said frame assembly comprising a frame configured to receive at least one lens, a pair of projecting end pieces, and a corresponding pair of temples being pivotally secured to said projecting end pieces, respectively, said frame also comprising a front side and a back side, said back side of said frame being closer to the wearer's face when worn than said front side of said frame, said frame comprising a pair of corbels extending outwardly from said back side of said frame, being proximate to said pair of projecting end pieces, respectively, and wherein each of said pair of corbels comprises a securing surface, said securing surface being angled with respect to a top surface of said frame, said frame assembly comprising a pair of magnets respectively received by each of said securing surfaces; said subframe assembly comprising a subframe having a front side and a rear side, said rear side of said subframe being closer to the wearer's face than said front side, said subframe assembly comprising a pair of arms extending from said rear side of said subframe, each of said pair of arms having a first end secured to said subframe and a second end opposite said first end, said second end of said pair of arms being angled to correspond to said angled securing surface of said corbels, said subframe assembly comprising a magnetic member on each of said second ends of said arms, said subframe assembly being releasably securable to said frame assembly by said magnets of said frame assembly being attracted to said magnetic members of said subframe assembly.

2. The eyeglass assembly according to claim 1 wherein each of said angled securing surfaces is at an angle of greater than 0° and less than 90° to a plane that is parallel to a top surface of said frame.

3. The eyeglass assembly according to claim 2 wherein said arms of said subframe assembly extend over at least a portion of said top surface of said frame.

4. The eyeglass assembly according to claim 1 wherein said arms of said subframe assembly extend under at least a portion of a bottom surface of said frame.

5. The eyeglass assembly according to claim 2 wherein said securing surfaces comprise a top surface on said corbels, said corbels further comprising a front surface and a side surface, and wherein said magnets are received on said corbel top surfaces.

6. The eyeglass assembly according to claim 5 wherein said front surface of said corbels tapers from an outer edge of said top surface of said corbel toward said back side of said frame.

7. The eyeglass assembly according to claim 5 wherein said top surface of said corbel is at an angle being between 5° to 85° relative to a horizontal plane formed by said top surface of said frame.

8. The eyeglass assembly according to claim 7 wherein said top surface of said corbel is at an angle being between 15° to 75° relative to said horizontal plane.

9. The eyeglass assembly according to claim 8 wherein said top surface of said corbel is at an angle being between 30° to 60° relative to said horizontal plane.

10. The eyeglass assembly according to claim 9 wherein said top surface of said corbel is at a 45° angle relative to said horizontal plane.

11. The eyeglass assembly according to claim 5 wherein said corbel is integrally formed with said frame.

12. The eyeglass assembly according to claim 5 wherein said corbel is a separate member fixedly secured to said frame.

13. The eyeglass assembly according to claim 4 wherein said securing surfaces comprise a bottom surface on said corbels, said corbels further comprising a front surface and a side surface, and wherein said magnets are received on said corbel bottom surfaces.

14. The eyeglass assembly according to claim 13 wherein said top surface of said corbels extends from said back side of said frame to an outer edge of said bottom surface of said corbel.

15. The eyeglass assembly according to claim 13 wherein said bottom surface of said corbel is at an angle being between 5° to 85° relative to a horizontal plane formed by said top surface of said frame assembly.

16. The eyeglass assembly according to claim 15 wherein said bottom surface of said corbel is at an angle being between 15° to 75° relative to said horizontal plane.

17. The eyeglass assembly according to claim 16 wherein said bottom surface of said corbel is at an angle being between 30° to 60° relative to said horizontal plane.

18. The eyeglass assembly according to claim 17 wherein said bottom surface of said corbel is at a 45° angle relative to said horizontal plane.

19. The eyeglass assembly according to claim 13 wherein said corbel is integrally formed with said frame.

20. The eyeglass assembly according to claim 13 wherein said corbel is a separate member fixedly secured to said frame assembly.

21. The eyeglass assembly according to claim 1 wherein said magnets on said frame are disk-shaped, and wherein said magnetic members on said subframe have a disk shape corresponding to said disk shape of said magnets of said frame.

22. The eyeglass assembly according to claim 21 wherein said magnets on said frame each comprise a magnetic pin; and wherein said magnetic members on said subframe each comprise an orifice configured to respectively receive said magnetic pin of said magnets of said frame, when said subframe assembly is releasably secured to said frame assembly.

23. The eyeglass assembly according to claim 22 wherein said top surface of said corbel is at an angle of 45° relative to a horizontal plane formed by said top surface of said frame.

24. The eyeglass assembly according to claim 23 wherein said subframe has a top surface and said arms are secured to said top surface of said subframe; and wherein said second end of said arms comprise a surface that is angled to correspond to said angle of said top surface of said corbels.

25. The eyeglass assembly according to claim 24 wherein substantially the entire surface of said magnetic members on said subframe assembly correspondingly contact the surface of said magnetic members of said frame assembly.

26. The eyeglass assembly according to claim 24 wherein substantially the entire surface of said magnets on said frame assembly contact the surface of said magnetic members of said subframe assembly.

27. The eyeglass assembly according to claim 1 wherein said angled securing surface of each of said corbels is at a 45° angle relative to a horizontal plane formed by a top surface of said frame.

28. The eyeglass assembly according to claim 27 wherein an engagement surface of said pair of magnets on said corbels and an engagement surface on said magnetic members on said arms each comprise a roughened surface configured to increase the coefficient of friction therebetween.

29. An eyeglass assembly comprising:
a primary frame assembly comprising:
- a primary frame configured to receive one or more lenses, and having a first end and a second end, and a region between said first and second ends configured to serve as a nose bridge;
- a first projecting end piece and a second projecting end piece, each of said first and second projecting end pieces configured to extend away from said primary frame at said first end and said second end of said primary frame, respectively;
- a first corbel formed proximate to an intersection between said first projecting end piece and said primary frame, said first corbel comprising a top surface being downwardly angled with respect to said primary frame;
- a second corbel formed proximate to an intersection between said second projecting end piece and said primary frame, said second corbel comprising a top surface being downwardly angled with respect to said primary frame;
- a first magnet and a second magnet fixedly secured to said angled top surface of said first and second corbels, respectively;
- a first temple arm and a second temple arm pivotally secured to said first and second projecting end pieces, respectively; and a secondary frame assembly configured to be releasably secured to said primary frame assembly, and comprising:
- a secondary frame configured to receive one or more lenses, and having a first end and a second end;
- a first arm and a second arm, each of said first and second arms configured to extend away from said secondary frame at said first end and said second end of said secondary frame, respectively, and configured to extend over at least a portion of a top surface of said primary frame when releasably secured thereto; a distal end of each of said first and second arms comprising an angled arm portion being positioned and angled to correspond to said downward angle of said top surface of said first and second corbels; and
- a first magnetic member and a second magnetic member secured to a bottom surface of said distal angled arm portion of said first and second arms, respectively; and wherein said downwardly angled top surfaces of said corbels on said primary frame, said correspondingly angled arm portions of said first and second arms on said secondary frame, and said magnets and magnetic members thereon, engage each other, and cooperate to provide said releasable securing of said secondary frame with said primary frame, and cooperate to reduce the risk of said secondary frame being inadvertently disengaged from said primary frame.

30. The eyeglass assembly according to claim 29, wherein said downward angle of said top surface of said first and second corbels is an angle in the range of 30 degrees to sixty degrees.

31. The eyeglass assembly according to claim 30, wherein an engagement surface of said first and second magnets on said corbels and an engagement surface on said first and second magnetic members on said arms of said secondary frame each comprise a roughened surface configured to increase the co-efficient of friction therebetween.

32. The eyeglass assembly according to claim 31, wherein said downward angle of said top surface of said first and second corbels is at an angle of 45 degrees.

33. The eyeglass assembly according to claim 30, wherein said first and second magnets on said primary frame are disk-shaped, and wherein said first and second magnetic members of said secondary frame have a disk shape corresponding to said disk shape of said first and second magnets.

34. The eyeglass assembly according to claim 33, wherein said first and second magnets on said primary frame each comprise a magnetic pin; and wherein said disk-shaped first and second magnetic members each comprise an orifice configured to respectively receive said magnetic pin of said first and second magnets when said secondary frame assembly is releasably secured to said primary frame assembly.

35. The eyeglass assembly according to claim 34, wherein said downward angle of said top surface of said first and second corbels is at an angle of 45 degrees.

* * * * *